United States Patent
Channapatana

(10) Patent No.: US 10,804,755 B2
(45) Date of Patent: Oct. 13, 2020

(54) STATOR CORE WITH AT LEAST THREE COOLING PIPES WITH END CRIMPS

(71) Applicant: Toshiba International Corporation, Houston, TX (US)

(72) Inventor: Chetan Channapatana, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 92 days.

(21) Appl. No.: 15/658,527

(22) Filed: Jul. 25, 2017

(65) Prior Publication Data
US 2019/0036392 A1 Jan. 31, 2019

(51) Int. Cl.
| H02K 9/04 | (2006.01) |
| H02K 1/20 | (2006.01) |
| H02K 9/19 | (2006.01) |
| H02K 15/02 | (2006.01) |

(52) U.S. Cl.
CPC ............... H02K 1/20 (2013.01); H02K 9/04 (2013.01); H02K 9/19 (2013.01); H02K 15/024 (2013.01)

(58) Field of Classification Search
CPC .. H02K 1/20; H02K 9/04; H02K 9/19; H02K 9/02; H02K 9/06; H02K 9/08; H02K 9/01; H02K 9/12; H02K 9/14; H02K 15/024
USPC .................... 310/54, 55–61, 216.058
See application file for complete search history.

(56) References Cited

U.S. PATENT DOCUMENTS

| 2,386,701 | A | * | 10/1945 | Martin ............ | H02K 49/043 |
| | | | | | 188/264 D |
| 3,801,843 | A | | 4/1974 | Corman et al. | |
| 9,281,728 | B2 | * | 3/2016 | Buttner .......... | H02K 9/08 |
| 9,698,641 | B2 | * | 7/2017 | Folie ............ | H02K 9/20 |
| 9,698,653 | B2 | * | 7/2017 | Stiesdal ........ | H02K 1/20 |
| 2002/0005671 | A1 | * | 1/2002 | Welke ........... | H02K 1/20 |
| | | | | | 310/52 |
| 2009/0026858 | A1 | * | 1/2009 | Knauff ......... | H02K 1/20 |
| | | | | | 310/59 |
| 2010/0026111 | A1 | | 2/2010 | Monzel | |
| 2011/0109095 | A1 | * | 5/2011 | Stiesdal ........ | H02K 1/20 |
| | | | | | 290/55 |
| 2012/0074798 | A1 | * | 3/2012 | Bywaters ....... | H02K 1/16 |
| | | | | | 310/54 |
| 2015/0091398 | A1 | * | 4/2015 | Bradfield ....... | H02K 9/19 |
| | | | | | 310/54 |

FOREIGN PATENT DOCUMENTS

| DE | 102011076904 A1 * | 2/2016 |
| JP | 2002058182 A | 2/2002 |

OTHER PUBLICATIONS

DE102011076904A1 English Translation.*

* cited by examiner

Primary Examiner — Maged M Almawri
(74) Attorney, Agent, or Firm — Baker Botts L.L.P.

(57) ABSTRACT

A stator core is assembled by stacking stator core laminations on pipes spaced in regular intervals circumferentially from one another around the outer peripheral edge of the stator core. The laminations are held on the pipes using crimps in the pipe at either end of the stack length. The stator can be integrated inside an electric motor in such a manner as to greatly enhance the cooling capabilities, and will improve the manufacturing quality of the stator core. Further, cooling media can be passed through the pipe to increase the cooling effect.

12 Claims, 5 Drawing Sheets

STATOR CORE WITH AT LEAST THREE COOLING PIPES WITH END CRIMPS

TECHNICAL FIELD

The present invention relates to the assembly of electric motor stator cores. More particularly, the invention relates to the stacking of a stator core using pipes for the placement of stator core laminations rather than welding or cleating.

BACKGROUND

The present application relates generally to the assembly of electric motor stator cores and the preferred embodiments provide novel stacking methods and cooling features in the context of electric motor stator cores.

A stator core is made up of a stack of pre-punched laminations assembled into a motor housing that is made of aluminum or cast iron. These laminations are made of silicon steel. Attachment of the laminations is necessary for several reasons but principally to ensure that the form of the stator core is maintained under the forces imposed during operation of the motor. Improper attachment can result in vibration or movement of the laminations during operation of the motor, and eventually can lead to failure of the motor.

The individual pre-punched laminations have traditionally been attached to one another by welding, cleats, an adhesive, riveting, or bolting. Welding of the laminations can lead to shorting of the magnetic flux generating within the stator core, because the magnetic flux is allowed to circulate lengthwise rather than within the plane of the stator. Another common method of attachment is cleating, wherein a v-shaped strip is rolled and flattened into a dovetail slot of the stator laminations.

In existing electric motors, the rotating electric machinery can be subjected to extreme heat. In order to address this, manufacturers have developed external cooling systems that seek to reduce the heat generated within the motor. However, existing cooling systems have been complicated and costly to manufacture and have other drawbacks.

SUMMARY

A method of assembling a stator core is disclosed. A plurality of annular stator core laminations are provided. At least one hole of a preselected diameter has been cut into each stator core lamination near an outer circumferential edge at a defined radial distance. The stator core laminations are stacked by fitting the hole of each stator core lamination around the cooling pipe. The cooling pipe has a first end and a second end, and the length of the pipe is equal to a stack length of the stator core. Finally, the stator core laminations are attached to the cooling pipe by creating a crimp in the first and second ends of the pipe.

A stator core assembly is disclosed. The assembly is comprised of at least one cooling pipe, having a first and second end which defines the stack length of the stator core. The assembly also has a plurality of stator core laminations, each having at least one hole of a preselected diameter cut near an outer circumferential edge of each stator core lamination at a defined radial distance. The plurality of stator core laminations are stacked onto the cooling pipe by fitting the cooling pipe through the hole cut near the outer circumferential edge of each stator core lamination; and the stator core laminations are attached to the at least one cooling pipe by creating a crimp in the first and second ends of the cooling pipe.

BRIEF DESCRIPTION OF THE DRAWINGS

For a more complete understanding of the present disclosure and its features and advantages, reference is made to the following description, taken in conjunction with the accompanying drawings, in which.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only and not exhaustive of the scope of the disclosure.

DETAILED DESCRIPTION

Illustrative embodiments of the present disclosure are described in detail herein. In the interest of clarity, not all features of the actual implementation are described in this specification. It will of course be appreciated that in the development of any such embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of this disclosure. Furthermore, in no way should the following examples be read to limit or define the scope of the disclosure.

The preferred embodiments of the present invention provide two advantageous features. First, an improved stator core stacking method improves the manufacturing quality of the stator cores because the shorting and loss of magnetic flux that occurs when the laminations are welded together can be avoided. Second, the inclusion of cooling pipes in the stator core improves the cooling capabilities. Air or other cooling media can be passed through the pipe in order to cool the stator core.

Figure 1:
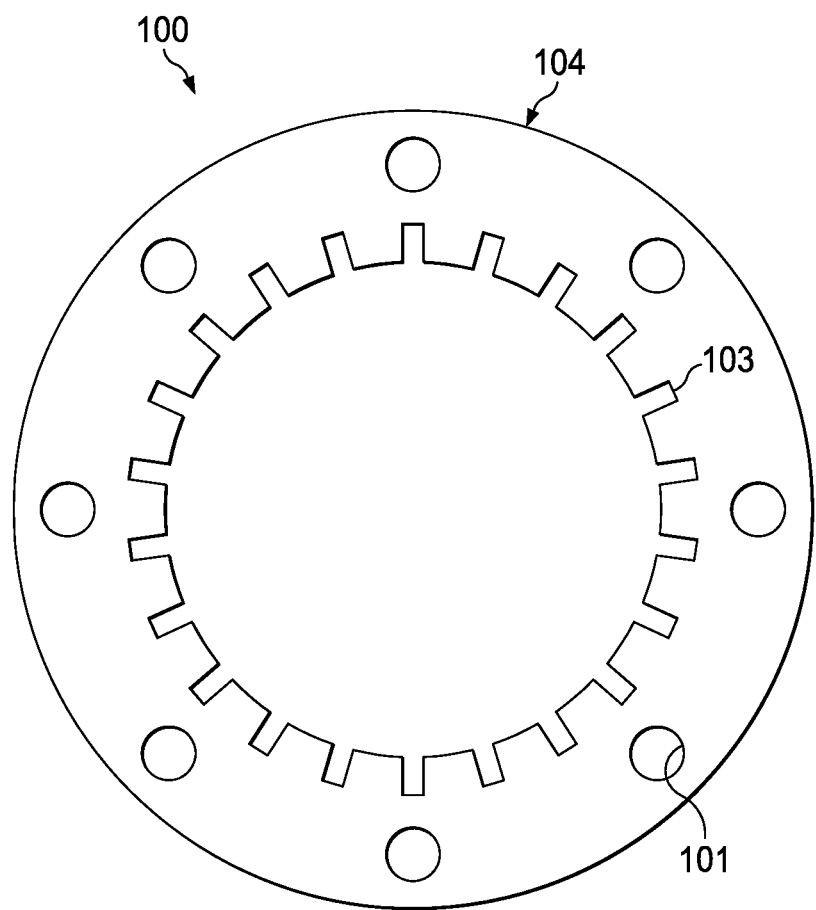
FIG. 1 is an illustrative drawing of a stator core assembly stacked using cooling pipes, as described herein.
Figure 2:
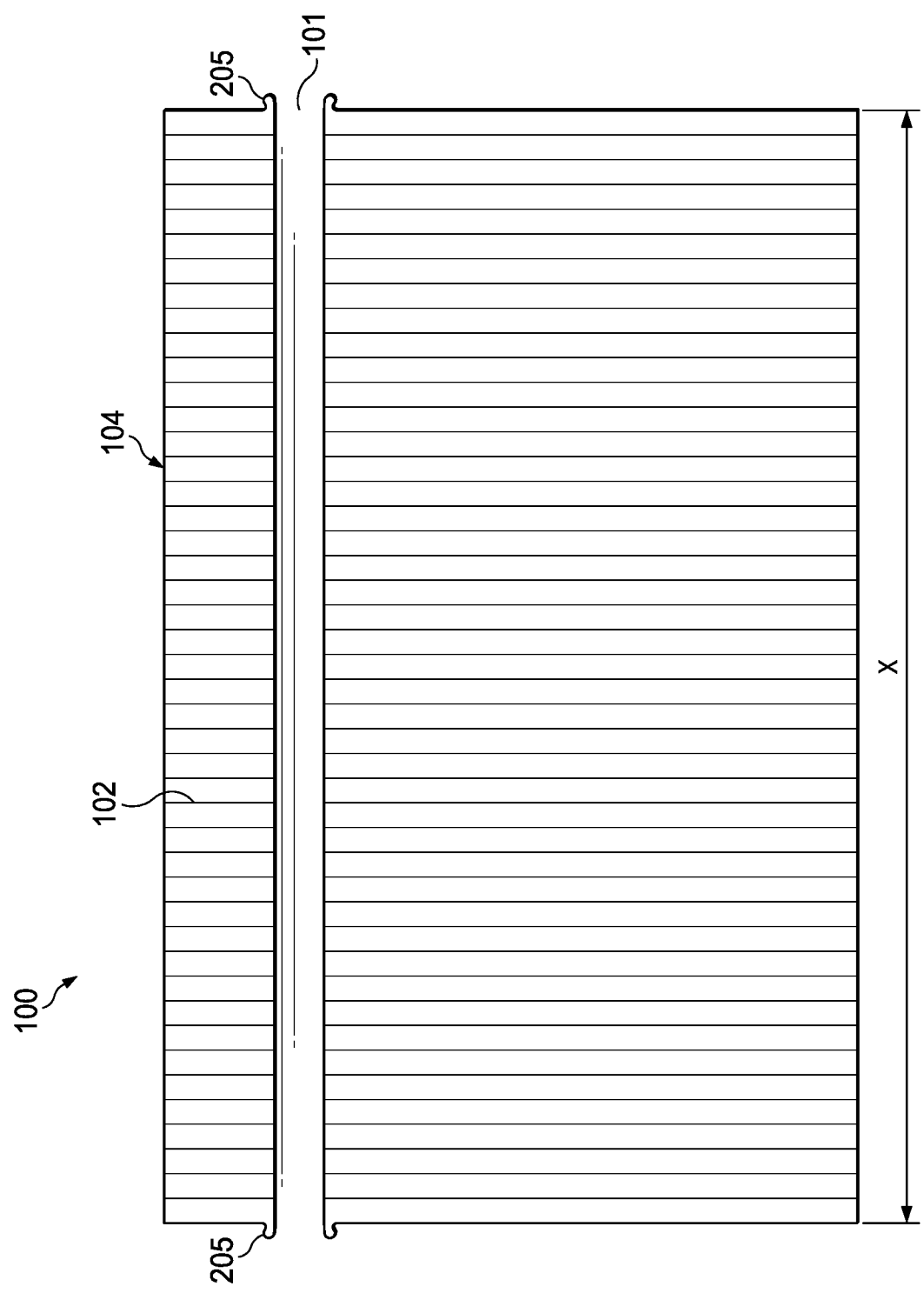
FIG. 2 is an illustrative drawing of a length-wise cross-section of a stator core assembly stacked using cooling pipes, as described herein.
Figure 3:
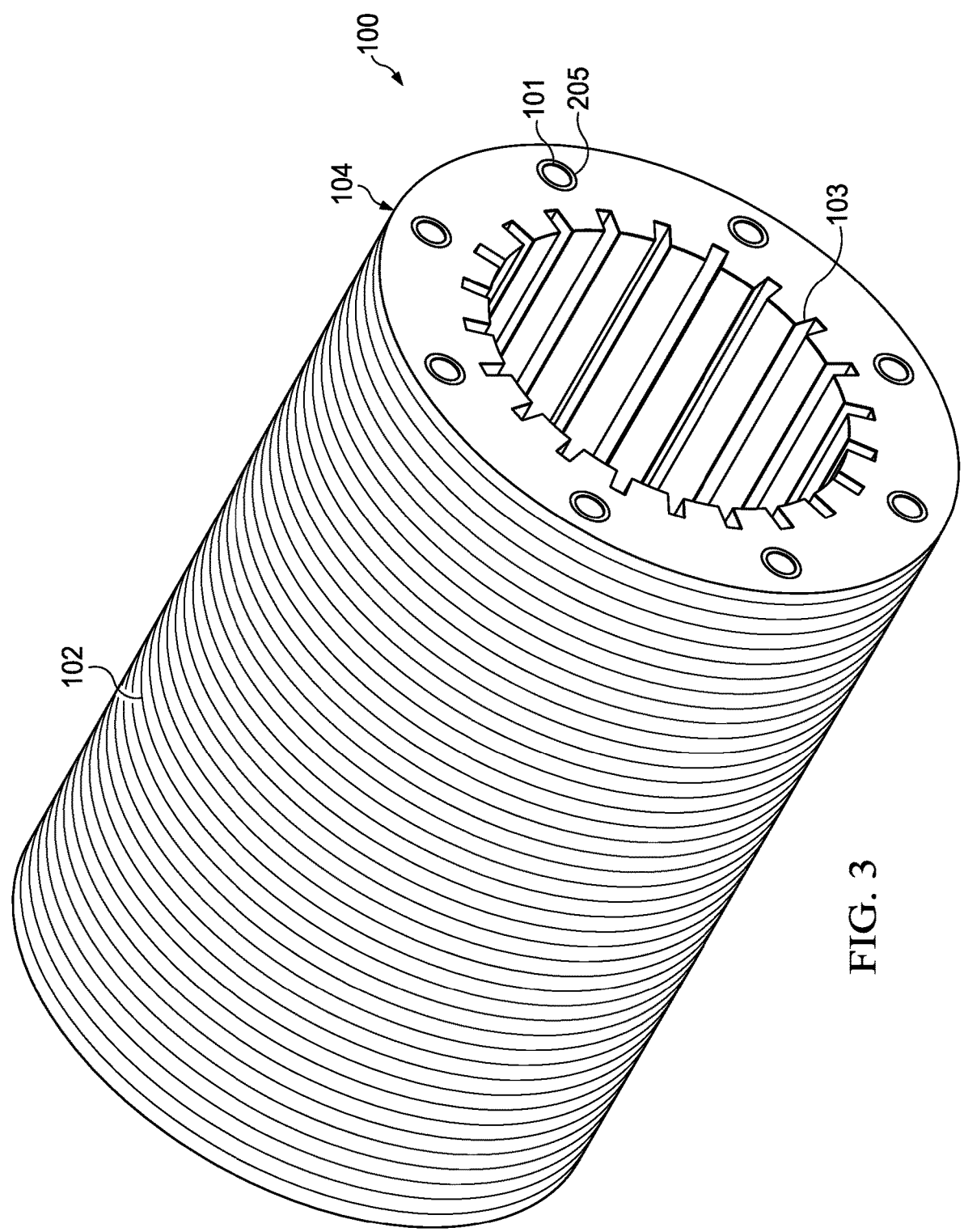
FIG. 3 is an illustrative drawing of a fully assembled stator core stacked using cooling pipes, as described here.

Turning now to the drawings, FIG. 1 shows a cross-section of a stator core 100 as described herein. The stator core 100 is comprised of at least one cooling pipe 101, having a first and second end which defines the stack length, x, of the stator core, as shown in FIG. 2. The stator core also has a plurality of stator core laminations 102, each having at least three holes of a preselected diameter cut near an outer circumferential edge 104 of each stator core lamination at a defined radial distance. The plurality of stator core laminations 102 are stacked onto the cooling pipes by fitting the cooling pipes 101 through the hole cut near the outer circumferential edge 104 of each stator core lamination; and the stator core laminations 102 are attached to the at least three cooling pipe by creating a crimp 205 in the first and second ends of the cooling pipes 101. FIG. 3 shows a fully assembled stator core according to the present disclosure.

A method of assembling a stator core 100 is disclosed. A plurality of annular stator core laminations 102 are provided. At least three holes of a preselected diameter have been cut into each stator core lamination near an outer circumferential edge 104 at a defined radial distance. The stator core laminations 102 are stacked by fitting the hole of each stator core lamination around three cooling pipes 101. The cooling pipes each have a first end and a second end, and the length of the pipe is equal to a stack length, x, of the stator core. Finally, the stator core laminations 102 are attached to the cooling pipes 101 by creating a crimp 205 in the first and second ends of each pipe.

Preferably, multiple cooling pipes are used to stack the stator core laminations. In one embodiment, at least four holes of a preselected diameter have been cut into each stator core lamination near an outer circumferential edge 104, and wherein the holes are placed circumferentially equidistant from one another near the circumferential edge of the stator core lamination. The stator core laminations 102 are then stacked on four cooling pipes 101 in order to cool the entire circumference of the stator.

In another embodiment, at least six holes of a preselected diameter have been cut into each stator core lamination near an outer circumferential edge 104, and wherein the holes are placed circumferentially equidistant from one another near the circumferential edge of the stator core lamination. The stator core laminations 102 are then stacked on six cooling pipes 101 in order to cool the entire circumference of the stator.

The inclusion of more cooling pipes 101 provides more cooling to the stator core 100. It is preferable to place the cooling pipes 101 symmetrically around the circumference of the stator core 100 in order to maintain balance and weight distribution within the motor.

Placement of the pipe 101 as close to the edge 104 as possible minimizes current loss. However, placement of the cooling pipes as close to the stator slots 103 as possible maximizes the temperature dissipation. Therefore, the cooling pipes 101 can be placed near an outer circumferential edge 104 at a defined radial distance to optimize their location.

Stamping is the most popular method used for lamination fabrication. The advantages of stamping include high productivity, low cost, and simplicity of stamping process. However, stamping can produce burrs and warps near the lamination edges, which can lead to difficulties in stacking and tolerance control.

Laser cutting is also used for lamination fabrication, oftentimes in special cases, such as for stators with extra-large dimensions or very complex geometries and shapes. In laser cutting, a high-energized laser beam is focused in a very tiny spot so that the local temperature rises extremely high to melt lamination sheets. This process generates much smaller residual stresses, lower distortion, better surface finishing, and high precise dimension control over the stamping process. However, laser cutting has lower productivity, higher power consumption, and higher costs.

In certain embodiments, at least three holes of a preselected diameter are stamped into the stator core lamination 102 near an outer circumferential edge 104 at a defined radial distance when the initial stamping of the stator core lamination 102 is done. The diameter of the hole is preferably cut only slightly larger than the diameter of the cooling pipe 101 so that the stator laminations 102 are held in place on the pipe 101 and cannot move.

In certain embodiments, a stator stack is formed by stacking laminations 102 into a pack. These stator stacks are then fitted onto cooling pipes 101 by sliding the pipes 101 through the holes cut into the lamination 102 near an outer circumferential edge 104 at a defined radial distance. The stacking process disclosed herein can be either automated or hand-assembled, depending on the size of the motor.

In certain embodiments, the cooling pipe 101 is made of a thermally conductive material. One of ordinary skill in the art will recognize that such thermally conductive materials can include copper, steel, or a composite material.

In certain embodiments, the stator core laminations 102 are held onto the cooling pipe 101 by creating crimps 205 in the ends of the pipes 101. The pipe 101 can be crimped by either a hot-crimping process or a cold-crimping process.

Attaching the laminations 102 to the cooling pipes 101 by crimping the ends of the pipe 101 is preferable to welding for several reasons. When the stator core laminations 102 are welded together, the magnetic flux is allowed to circulate lengthwise throughout the stator core 100, rather than in the plane of the laminations 102. This can lead to loss of magnetic strength. Therefore, attaching the stator core laminations 102 to the pipe 101 can prevent loss of magnetic flux due to shorting.

Further, use of pipes 101 to stack the stator core 100 can allow for the creation of smaller motors without sacrificing magnetic strength because the stack length, x, as shown in FIG. 2, can be shortened. For example, prior systems have utilized a sealed heat pipe to cool the stator core. These sealed heat pipes require the entire stator core to be elongated in order to cool the distal end of the heat pipe. In certain embodiments of the present disclosure, the stack length, x, can be shortened because the cooling pipe 101 can circulate air throughout the stator core 100 without elongating the stator core 100.

Figure 4:
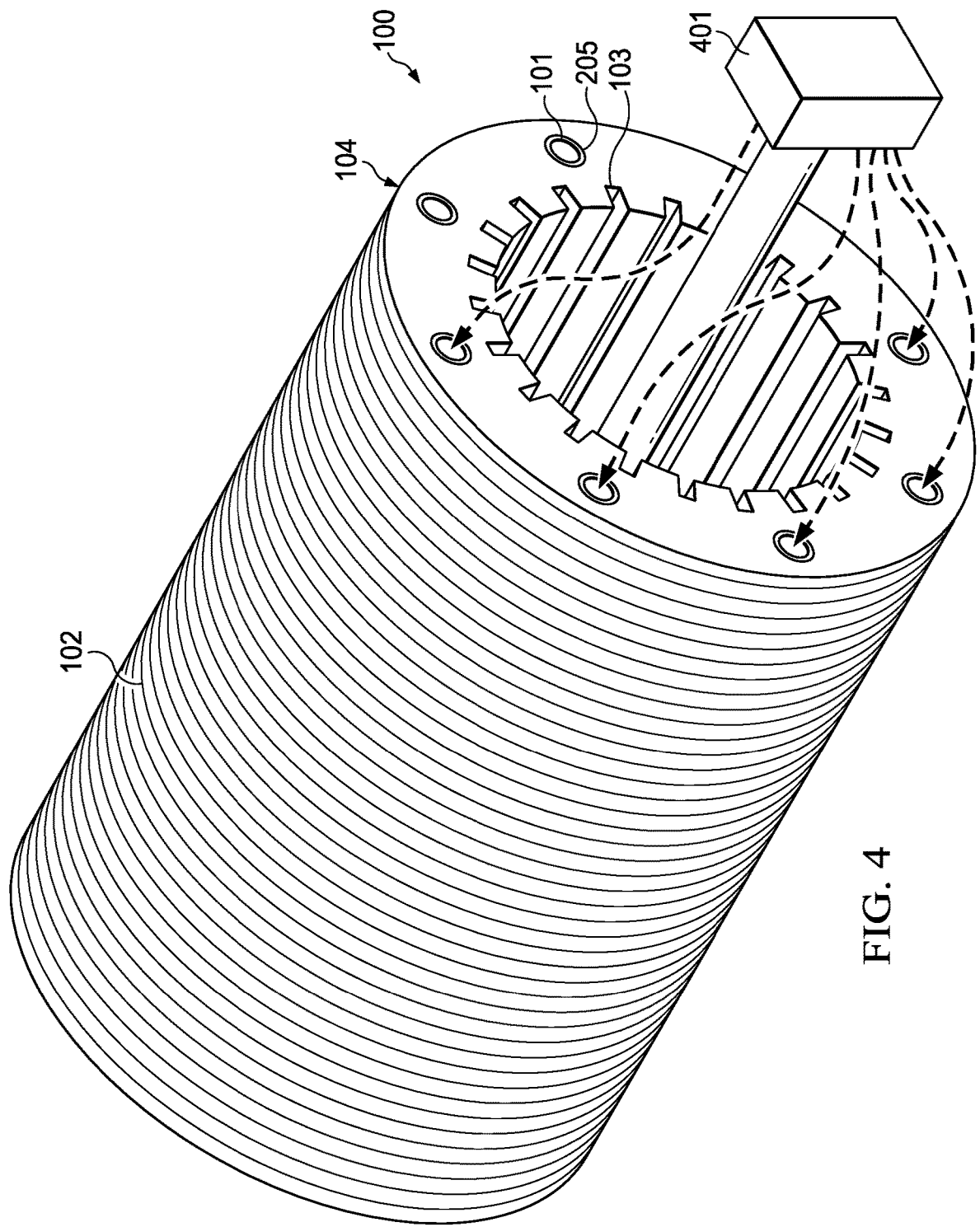
FIG. 4 is an illustrative drawing of a stator core assembly connected to fans for circulation of air throughout the cooling pipes, as described herein.
Figure 5:
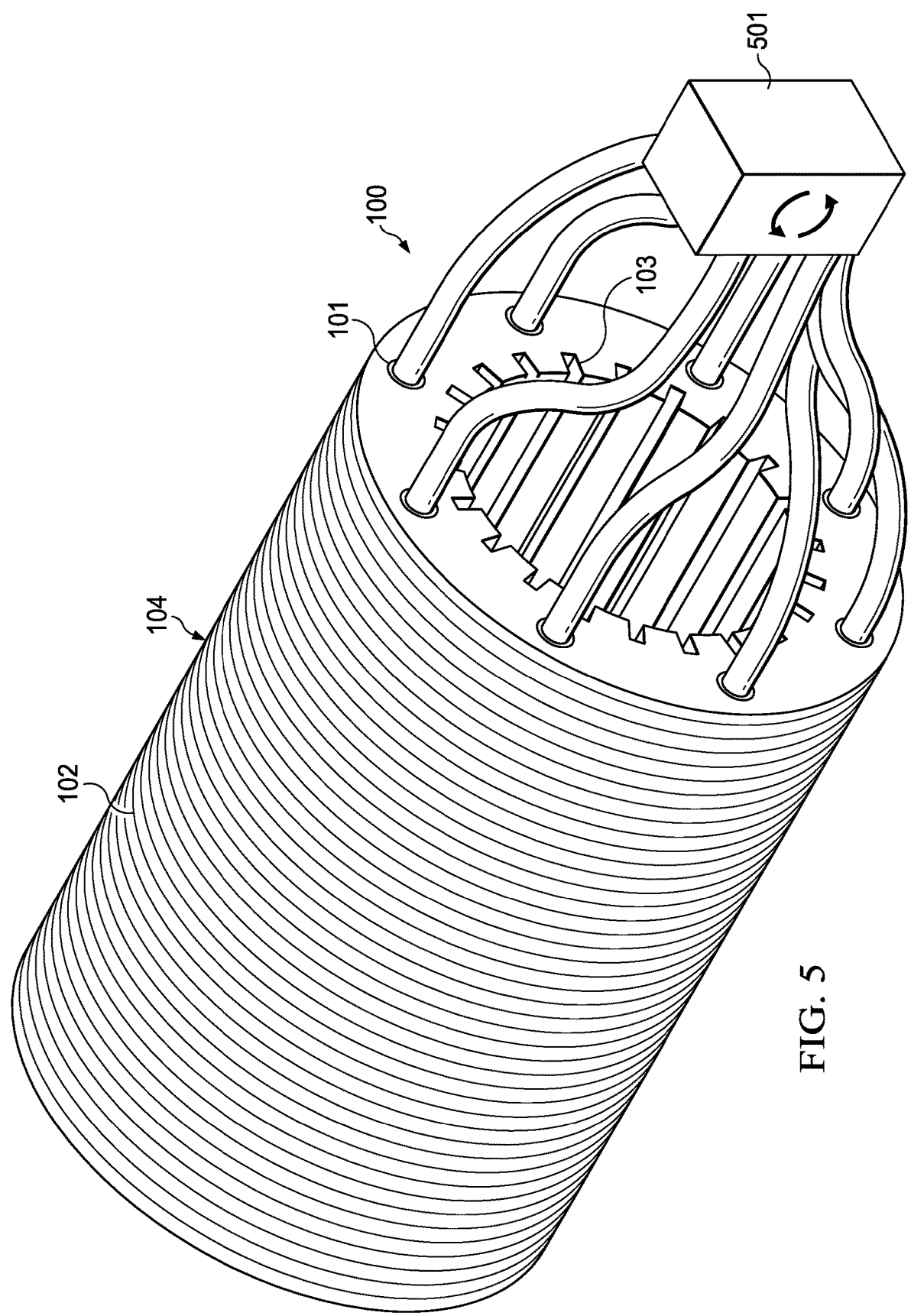
FIG. 5 is an illustrative drawing of a stator core assembly connected to a fluid circulation system for circulation of cooling media throughout the cooling pipes, as described herein.

Stacking using pipes 101 also improves the cooling capability of the stator core 100. In certain preferred embodiments, air can be circulated through the pipes using a fan 401 to cool the stator core, as shown in FIG. 4. In other preferred embodiments, the pipes can be connected to fluid circulation system 501 to circulate fluid within the pipe to cool the stator core, as shown in FIG. 5. One of ordinary skill in the art will recognize that such fluids can include water, oil, or any other fluid capable of cooling the stator core. Liquid-cooled electrical machines are additionally quieter during operation since no fans are needed. On the other hand, the technical complexity involved for liquid cooling is much greater than for air cooling.

Preferably, the hole(s) in the stator core laminations 102 are provided close to a hotspot in the stator core 100 to provide improved cooling capabilities to the motor.

Although the present disclosure and its advantages have been described in detail, it should be understood that various changes, substitutions and alterations can be made herein without departing from the spirit and scope of the disclosure as defined by the following claims.

What is claimed is:

1. A stator core, comprising: at least three cooling pipes, each having a first end and a second end, and wherein a distance between the first end and second end of the cooling pipe is equal to a stack length of the stator core, wherein each of the first end and the second end are crimped; a plurality of stator core laminations, wherein at least three holes of a preselected diameter have been cut into each stator core lamination near an outer circumferential edge of each stator core lamination at a defined radial distance from an inner circumferential edge, wherein the at least three holes are placed circumferentially equidistant from one another near the outer circumferential edge of each stator core lamination, wherein the at least three cooling pipes are disposed in the at least three holes, wherein each stator core lamination comprises a plurality of stator slots, wherein the plurality of stator slots is disposed concentric to a central axis of the stator core, wherein the plurality of stator slots is disposed at the inner circumferential edge of each stator core lamination; and wherein the plurality of stator core laminations is stacked onto the cooling pipes by fitting the cooling pipes through the holes cut near the outer circumferential edge of each stator core lamination, wherein the at least three holes are radially aligned with the stator slots.

2. The stator core of claim 1, wherein the at least three cooling pipes can be connected to a fluid circulation system to circulate fluid within the pipe to cool the stator core.

3. The stator core of claim 1, wherein air can be circulated through the at least three cooling pipes to cool the stator core.

4. The stator core of claim 1, wherein the at least three cooling pipes are crimped using at least one of a hot crimping process and a cold crimping process.

5. The stator core of claim 1, wherein at least four holes have been cut into each stator core lamination near an outer circumferential edge, and wherein the holes are placed circumferentially equidistant from one another near the outer circumferential edge of the stator core lamination.

6. The stator core of claim 1, wherein at least six holes of a preselected diameter have been cut into each stator core lamination near an outer circumferential edge at a defined radial distance, and wherein the holes are placed circumferentially equidistant from one another near the circumferential edge of the stator core lamination.

7. The stator core of claim 1, wherein at least one cooling pipe is located close to at least one hotspot of the stator core to provide improved cooling of the stator core.

8. The stator core of claim 1, wherein the plurality of stator core laminations are first formed into a stator stack, and then the stator stack is fitted onto the cooling pipe.

9. An electric motor comprising: a shaft; a rotor fitted on the shaft; and a stator that comprises: a stator core, comprising: at least three cooling pipes, each having a first end and a second end, wherein a distance between the first end and second end of the cooling pipe is equal to a stack length of the stator core, wherein each of the first end and the second end are crimped; a plurality of stator core laminations, wherein at least three holes of a preselected diameter have been cut into each stator core lamination near an outer circumferential edge of each stator core lamination at a defined radial distance from an inner circumferential edge, wherein the at least three holes are placed circumferentially equidistant from one another near the outer circumferential edge of each stator core lamination, wherein the at least three cooling pipes are disposed in the at least three holes, wherein each stator core lamination comprises a plurality of stator slots, wherein the plurality of stator slots is disposed concentric to a central axis of the stator core, wherein the plurality of stator slots is disposed at the inner circumferential edge of each stator core lamination; and wherein the plurality of stator core laminations is stacked onto the cooling pipes by fitting the cooling pipes through the holes cut near the outer circumferential edge of each stator core lamination, wherein the at least three holes are radially aligned with the stator slots.

10. The electric motor of claim 9, wherein the at least three cooling pipes can be connected to a fluid circulation system to circulate fluid within the pipes to cool the stator core.

11. The electric motor of claim 9, wherein air can be circulated through the at least three cooling pipes to cool the stator core.

12. The electric motor of claim 9, wherein at least one cooling pipe is located close to at least one hotspot of the stator core to provide improved cooling of the stator core.

* * * * *